July 23, 1963 A. L. PIZZI ET AL 3,098,291

APPARATUS FOR ASSEMBLING-ARTICLES

Filed Dec. 1, 1960 4 Sheets-Sheet 1

INVENTORS
A.L.PIZZI
S.ZOLNER
BY W.A. Johnson
ATTORNEY

APPARATUS FOR ASSEMBLING-ARTICLES

Filed Dec. 1, 1960

4 Sheets-Sheet 2

INVENTORS
A.L. PIZZI
S. ZOLNER
BY [signature]
ATTORNEY

July 23, 1963 A. L. PIZZI ET AL 3,098,291

APPARATUS FOR ASSEMBLING-ARTICLES

Filed Dec. 1, 1960 4 Sheets-Sheet 3

Inventors
A. L. PIZZI
S. ZOLNER
By W. A. Johnson
Attorney

APPARATUS FOR ASSEMBLING-ARTICLES

Filed Dec. 1, 1960 4 Sheets-Sheet 4

INVENTORS
A. L. PIZZI
S. ZOLNER
By W. A. Johnson
ATTORNEY 3,098,291
APPARATUS FOR ASSEMBLING ARTICLES
Albert L. Pizzi, Union, and Samuel Zolner, Cranford, N.J., assignors to Western Electric Company, Incorporated, a corporation of New York
Filed Dec. 1, 1960, Ser. No. 73,105
7 Claims. (Cl. 29—203)

This invention relates to apparatus for assembling articles, particularly electrical components on mounting plates.

The various electrical components and units required for telephone exchange equipment are mounted on plates of standard sizes having apertures therein, through which the terminals of the components and units may extend, and other apertures to receive the mounting studs of the components or mounting screws for the securing of the components to the plates. To mount the components and units individually, manually, considerable time is required and there exists an inconvenience regarding each component centered about the holding of the component in position while the holding means such as the nuts on the mounting studs and the screws, in other instances, are tightened.

Due to the fact that numerous mounting plates are to receive like groups of components, it has been determined that there would be a great reduction in assembly time and more efficient mounting of the components if numerous mounting plates, with their components, could be held in their respective positions during the final mounting or securing of the components to the mounting plates.

The object of the invention is the provision of a solution to this problem in an efficient apparatus for assembling electrical components on mounting plates.

In accordance with the object, the invention comprises a hollow carriage with an open bottom having inwardly extending end flanges to support the ends of numerous mounting plates and an open top through which the mounting plates may be placed in the carriage and the components located thereon. A cover for the carriage closes the open top and firmly secures the components in their respective positions so that the carriage may be turned a one-half revolution to position the undersurfaces of the mounting plates so that suitable means may be employed to secure the components to their mounting plates.

More specifically, the carriage has its ends mounted on aligned spindles and provided with means actuable to lock the carriage either in its loading position or its reverse securing position, the locking means being associated also with a latch for the cover to secure the cover against opening during the movement out of its loading position and until returned to this position for the removal of the mounted components and plates.

Other objects and advantages will be apparent from the following detailed description when considered in conjunction with the accompanying drawings wherein.

Figure 2:
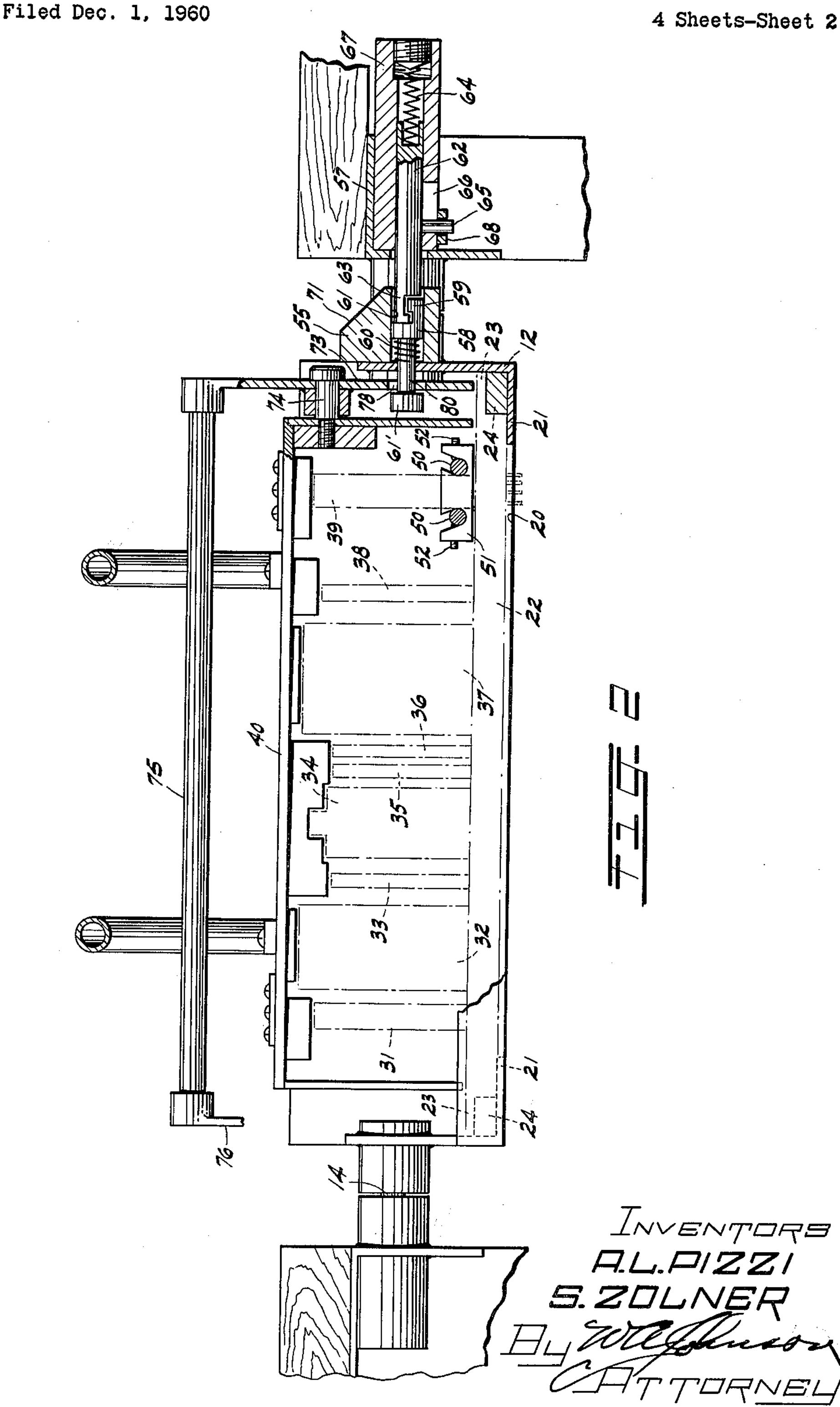
FIG. 2 is a vertical sectional view of the apparatus in closed position.

The apparatus includes a carriage 10 supported near the centers of end members 11 and 12 thereof by spindles 14 which are disposed in alignment with each other and mounted on supporting members such as angle members 15 and 16 mounted at spaced parallel positions beneath bench members 17 and 18, leaving an opening 19 in which the apparatus is disposed. The carriage 10 has an open bottom 20 provided with parallel flange structures 21 to support a plurality of parallel mounting plates 22. In the present instance, the mounting plates are substantially U-shaped in cross-section having reduced ends 23 with cutaway portions. The empty space in the areas of the cutaway portions of the reduced ends 23 are utilized to reinforce the flange structure 21 with rectangular bars 24 mounted as shown in FIG. 2. The mounting plates 22 have the conventional apertures therein through which leads 25 of components may extend and through which mounting studs 26, which are parts of some of the components or screws 27 used in securing other components to the mounting plates, may extend.

Figure 1:
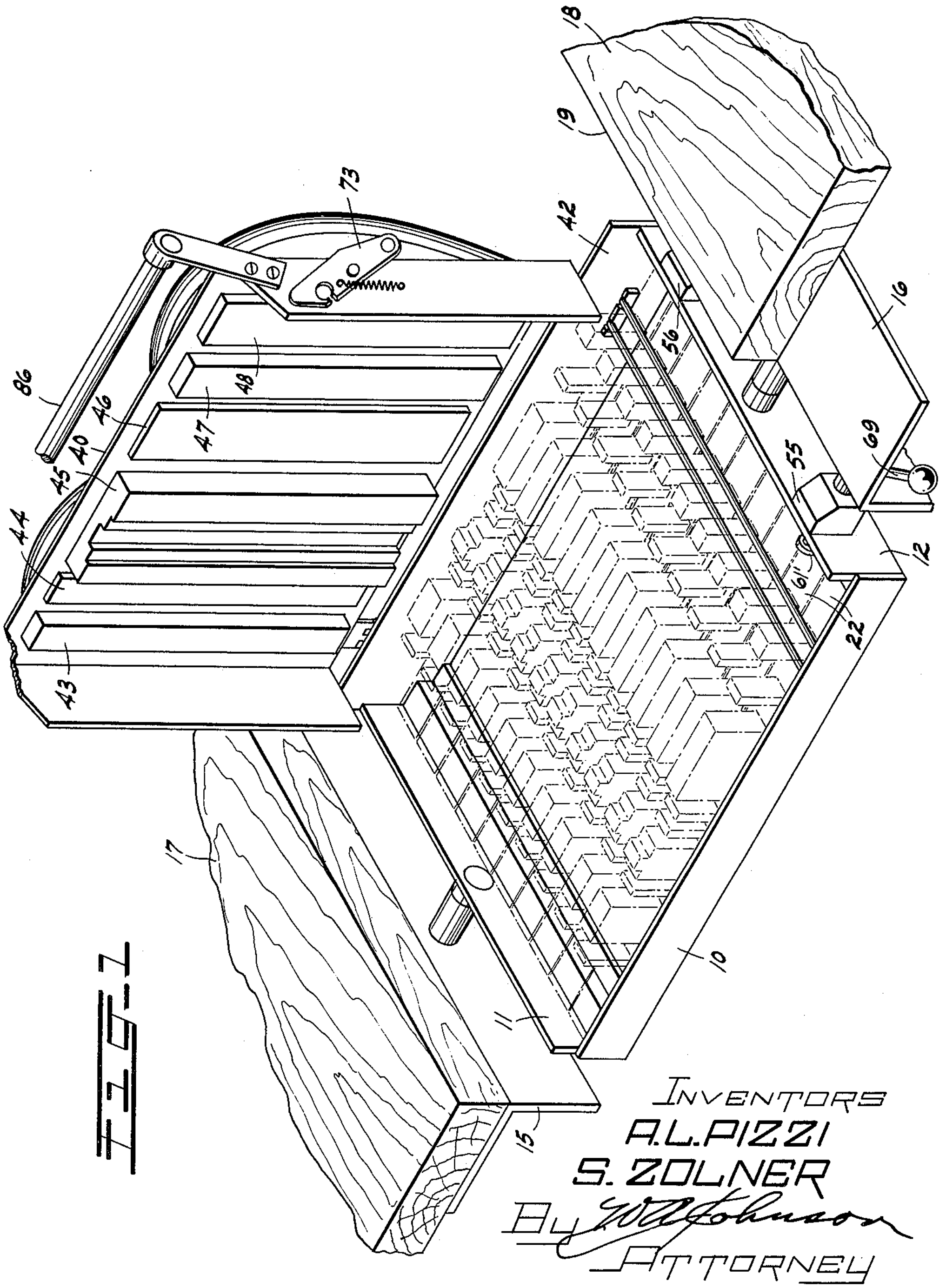
FIG. 1 is an isometric view of the apparatus with its cover in open position.

In the present instance, the carriage is adapted to receive ten mounting plates 22 when laid side by side, as illustrated in FIG. 1, with their ends resting on their flanges 21 and the bars 24. The top of the carriage 10 is open to receive the mounting plates and the numerous components shown at 31, 32, 33, 34, 35, 36, 37, 38, and 39. The components may differ from each other but, as illustrated, they are arranged in like order on all of the mounting plates so that suitable holding means may secure the components against displacement. This holding means is embodied in a cover 40 for the carriage which is hinged at 41 to a back wall 42 of the carriage. The cover is adapted to close the open top of the carriage and has a plurality of dielectric members 43 to 48, inclusive, fixed to the inner wall of the cover and having the proper thicknesses to rest upon and firmly hold the components 31 to 39, inclusive, against dislacement.

In the present instance, the components 31 to 38, inclusive, have studs 26 to extend through apertures in the mounting plates requiring no additional supporting means other than their respective members 43 to 47, inclusive, whereas the components 39 have only apertures to receive the screws 27 requiring additional holding means to support and hold the terminal carrying ends against displacement. This additional holding means includes parallel bars 50 which may be removed to allow positioning of the components 39 in place and returned to notched holders 51 which locate the components 39 on their respective mounting plate and carry retainining means, such as set screws 52, to secure the bars against displacement.

The locking means for the carriage is composed mainly of three units 55, 56 FIG. 1) and 57. The units 55 and 56 are apertured and mounted on the end member 12 of the carriage at equally spaced positions from the supporting spindle 14. The unit 55 has a spring-pressed element 58 with a hook-shaped portion 59 normally urged outwardly by a spring 60 beyond the outer end of the aperture 61 to a position limited by a head 61′ engaging the inner surface of the end 12 of the carriage. The unit 57 includes a lock 62 having a hook-shaped end 63 adapted to interengage the hook-shaped portions 59 when positioned free of its aperture 61. The lock 62 is backed by a spring 64 which is stronger than the spring 60 to cause the lock to move into the position shown in FIG. 2 when interengaging the element 58.

A pin 65, mounted on the lock 62 and extending downwardly therefrom through an elongate aperture 66 in its holder 67, is straddled by a bifurcated end 68 of a lever 69, pivoted at 70 to serve in manually moving the lock 66 against the force of its spring 68 into open or unlocked position. A tapered surface 71 of the unit 55 serves as a cam to move the lock to the right (FIG. 2) so that it may interengage the element 58 and result in locking the carriage automatically without the use of the lever 69.

Figures 3, 4:
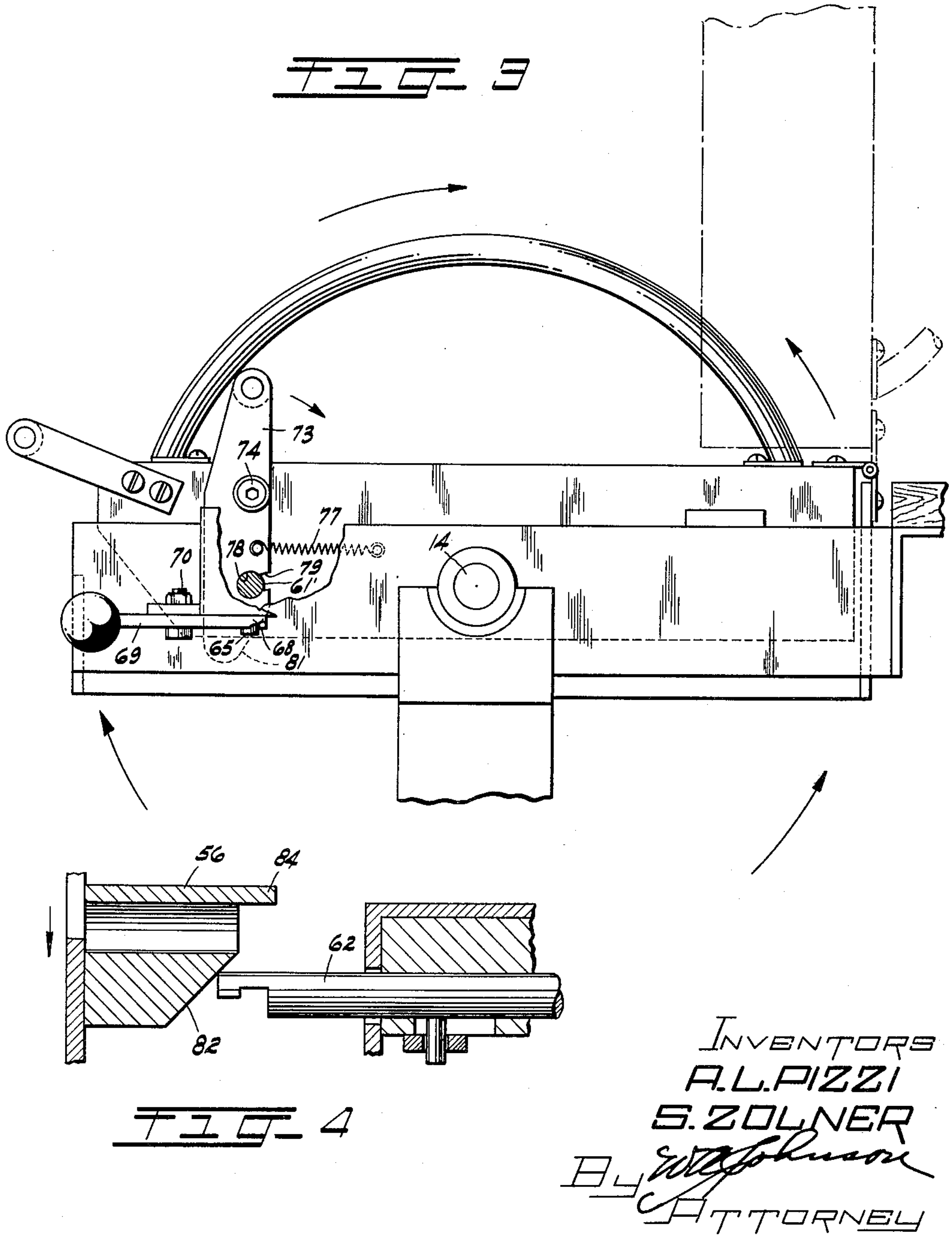
FIG. 3 is an end elevational view of the apparatus with the cover shown in broken lines in open position and in solid lines in closed position.
FIG. 4 is a fragmentary sectional view of the locking means.
Figure 5:
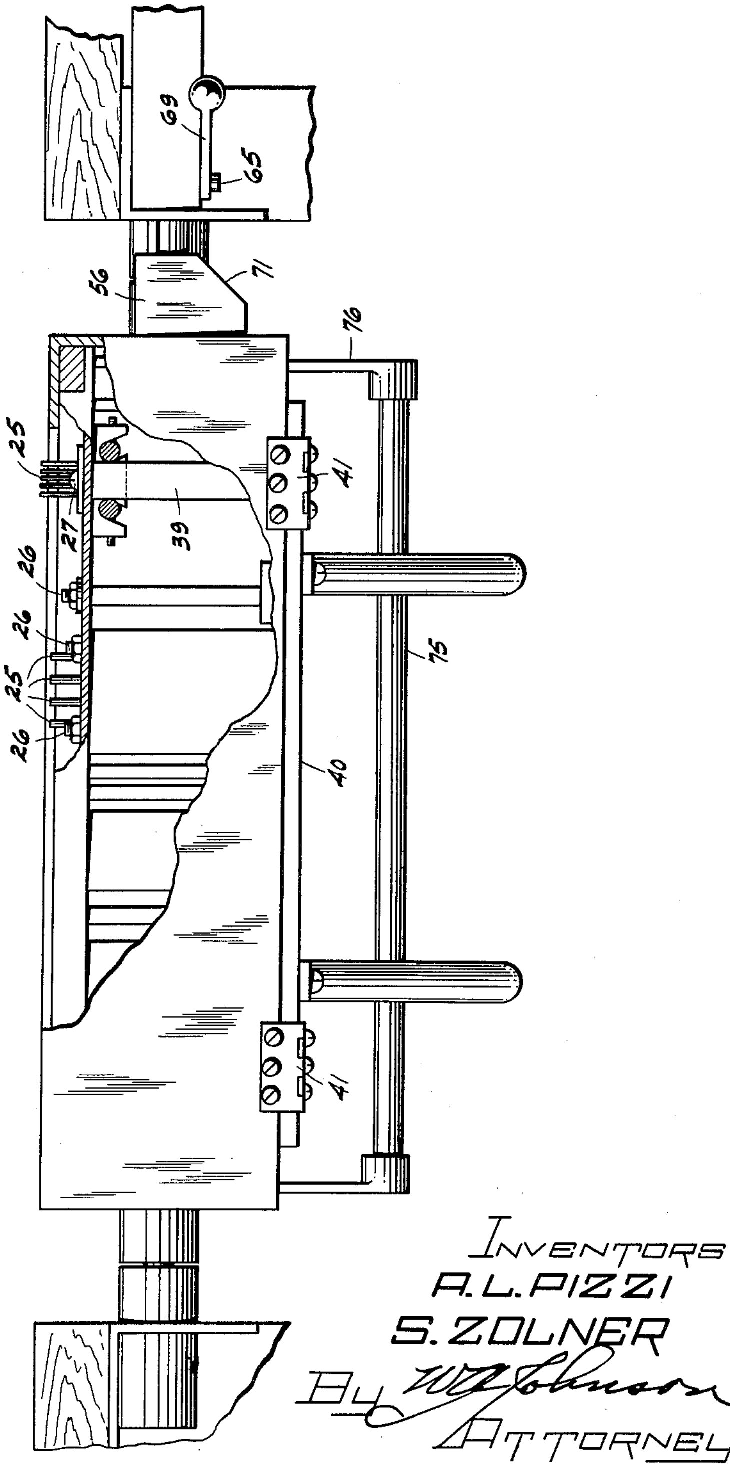
FIG. 5 is a front elevational view of the apparatus in the reversed or securing position, portions thereof being shown in section.

The latching means for the cover 40 is associated with the locking means, shown in FIG. 2, in that a latch 73 pivoted at 74 has one end of a bar 75 fixed to its upper end, the other end of the bar being supported by a pivotal lever 76. The latch, as shown in FIGS. 2 and 3, is urged into its latching position by a spring 77 and is provided with an aperture 78 sufficiently large, as shown in FIG. 2, to receive the head 61′ of the element 58. A passageway 79 is sufficiently large to receive a reduced shank 80 of the element 58 but not the head 61′. The latch 73 has a tapered surface 81 approaching the passageway 79 to ride on any portion of the element 58 to move the latch about its pivot 74 until the passageway 79 registers with the shank 80 of the element 58. When the lock 62 is in the position shown in FIG. 2 and it is desirable to rotate the carriage one-half cycle to its securing position, shown in FIG. 5, the lever 69 is actuated pulling the lock 62 and the element 58 to the right until the lock 62 may be free of the element, at which time the head 61′ is located in the aperture 78 where it will be held by the spring 60 firmly securing the cover in place.

The unit 56, illustrated in FIG. 4, shows its movement in the direction of the arrow when approaching the lock 62 so that its tapered surface 82 will engage the lock 62 and move it against its spring until the aperture 83 is positioned to receive the lock. This secures the carriage in the position shown in FIG. 5 and this time, all of the nuts may be placed upon the studs 26 and tightened, after which the screws 27 may be driven into the apertures of the components 39.

*Operation*

With the apparatus in the open loading position shown in FIG. 1, the numerous mounting plates 22 may be located on the flanges 21 after which the rows of components may be located in their respective positions on the mounting plates. During this interval, the carriage is locked in position, as illustrated in FIG. 2, and the cover may be moved forwardly into closed position by the aid of a handle 86 where it will be locked automatically by the latch 73 engaging the adjacent portion of the element 58.

Once the carriage is loaded with the mounting plates 22 and the components 31 to 39, inclusive, and the cover is closed and latched in place, the lever 69 is actuated to move the lock outwardly into open position. While the lock 62 is in open position, it has another function of preventing rocking movement of the carriage only in one direction, that direction which will free the element 58 from the lock and permit the tapered cam surface 82 of the unit 56 to be moved into engagement with the lock to cause interengagement of the lock and unit 56, as illustrated in FIG. 4. This action of the lock in connection with the unit 56 secures the carriage with the cover closed in the position shown in FIG. 5. At this time, the components are secured in place to their respective mounting plates and when this operation is completed, the lever 69 is actuated to move the lock 62 free of the unit 56, to free the carriage to return it to its loading position. Here again, through the aid of a projection 84, the lock 62 functions to prevent movement of the carriage in the wrong direction, but permits it to return in the right direction to the loading position.

When the carriage is returned to the loading position and the lock 62 automatically engages the element 58 so that the spring 64 may function to move the element 58 to the left to move the head 61′ from the aperture 78 of the latch 73, the latch may at that time, and only at that time, be moved manually about its pivot 74 against the spring 77 to free the cover for movement into open position. In other words, the latch 73 can be moved into open and closed positions only when the shank or intermediate portion of the element 58 is positioned relative to the passageway 79. The aperture 78 will receive the head 61′ only when the latch is closed and the latch will be held against opening until the head is moved free of the aperture 78 and the shank 80 is aligned with the passageway 79. At this time, the assembled components and mounting plates may be removed and the operation continued by loading the carriage with a new group of mounting plates and components. The arcuate handles on the cover may be used in moving the cradle from one position to another.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for assembling electrical components on mounting plates comprising a hollow carriage with an open bottom, having parallel flange structures extending inwardly from end members of the carriage to support ends of mounting plates having apertures therein short of the ends for terminals of components and for securing means, and an open top through which the carriage may be loaded with the ends of the mounting plates disposed on the flange structures and positioned perpendicular thereto and the components placed in upside-down order in their respective positions on the mounting plates, parallel supporting members mounted at fixed positions, aligned spindles mounted at fixed positions on the supporting members, means mounted on the spindles and fixed to the end members to rotatably support the carriage for movement on the spindles between a loading position and a securing position, means movably mounted on the carriage actuable to hold the components and mounting plates in the carriage, a lock mounted at a fixed position on one of the supporting members, and spaced units mounted on the carriage and having apertures for respectively interengaging the lock when the carriage is in its loading and securing positions so that the lock will releasably hold the carriage successively in said positions.

2. An apparatus for assembling electrical components on mounting plates according to claim 1 in which separate members disposed adjacent the units and cooperating with the lock to make possible movement of the carriage in predetermined direction only toward its loading and securing positions so that the lock will enter the apertures of the units automatically.

3. An apparatus for assembling electrical components on mounting plates according to claim 1 in which the holding means includes a cover for the carriage, means pivotally connecting the cover to the carriage and adapting the cover for movement into open and closed positions, and members fixed to an inner surface of the cover to engage the components when the cover is closed to hold the components and mounting plates against displacement.

4. An apparatus for assembling electrical components on mounting plates according to claim 3 in which a latch having an aperture therein is provided for the cover, means mounted on the cover to support the latch for movement between an open position and a closed position, and an element disposed in the aperture of one of the units and actuable by the lock when interengaging said unit to position a portion of the element to enter the aperture of the latch.

5. An apparatus for assembling electrical components on mounting plates according to claim 4 in which a head, larger in cross-section than a shank of the element to which the head is fixed is receivable in the aperture of the latch, and a passageway in the latch open to the aperture therein and adapted to receive the shank of the element so that the aperture of the latch may be moved into alignment with the head.

6. An apparatus for assembling electrical components on mounting plates according to claim 5 in which the lock and the element have members adapted to interengage each other when the carriage is moved into the loading position, means adapted to cause movement of the lock in one direction to position the member of the lock to engage the member of the element, and means to move the lock in another direction into the adjacent unit with the interengaging members to move the element to position its shank for entering the aperture of the latch through the passageway.

7. An apparatus for assembling electrical components on mounting plates according to claim 6 in which means is actuable to move the lock free of the unit in loading position and cause the interengaging members to move the head into the aperture of the latch.

No references cited.